United States Patent
Dragoi et al.

(10) Patent No.: US 6,838,847 B2
(45) Date of Patent: Jan. 4, 2005

(54) STALL PROTECTION BASED ON BACK EMF DETECTION

(75) Inventors: Corneliu Dragoi, Ontario (CA); Rodney Vanwyck, Ontario (CA)

(73) Assignee: Siemens VDO Automotive Inc., Mississauga (CA)

( * ) Notice: Subject to any disclaimer, the term of this patent is extended or adjusted under 35 U.S.C. 154(b) by 402 days.

(21) Appl. No.: 10/157,378

(22) Filed: May 28, 2002

(65) Prior Publication Data

US 2003/0210011 A1 Nov. 13, 2003

Related U.S. Application Data

(60) Provisional application No. 60/379,318, filed on May 9, 2002.

(51) Int. Cl.[7] .................................................. H02P 7/00
(52) U.S. Cl. ..................... 318/434; 318/254; 318/430; 318/432
(58) Field of Search .............................. 323/274, 284; 318/138, 254, 259, 599, 430–434, 439, 700, 800–811; 388/800–819, 900, 901; 361/21–24

(56) References Cited

U.S. PATENT DOCUMENTS

| | | | |
|---|---|---|---|
| 3,805,127 A | | 4/1974 | Svendsen ..................... 318/139 |
| 3,914,671 A | * | 10/1975 | Morton et al. ............... 318/139 |
| 3,968,414 A | * | 7/1976 | Konrad ........................ 318/259 |
| 4,007,409 A | * | 2/1977 | Thibaut ....................... 318/459 |
| 4,329,630 A | * | 5/1982 | Park ............................ 318/258 |
| 4,611,154 A | * | 9/1986 | Lambropoulos et al. ..... 318/490 |
| 4,829,218 A | * | 5/1989 | Bauer .......................... 388/811 |
| 5,506,487 A | | 4/1996 | Young et al. ............... 318/811 |
| 5,652,525 A | | 7/1997 | Mullin et al. ............... 324/772 |
| 5,767,654 A | | 6/1998 | Menegoli et al. ........... 318/811 |
| 5,811,946 A | | 9/1998 | Mullin et al. ............... 318/254 |
| 5,825,597 A | | 10/1998 | Young .......................... 361/31 |
| 5,977,743 A | | 11/1999 | Flock .......................... 318/811 |
| 6,055,359 A | * | 4/2000 | Gillett ........................ 388/819 |

OTHER PUBLICATIONS

Designers' Guide to Power Products, Application Manual, $2^{nd}$ Edition—SGS–Thomson Microelectronics, Jun. 1992, by Herbert Sax, p. 214–229.

* cited by examiner

*Primary Examiner*—David Martin
*Assistant Examiner*—Tyrone Smith

(57) ABSTRACT

A method of detecting a rotor condition of a dc motor is provided. The motor 14 is part of a motor control circuit 10 having a free-wheeling diode 20 in parallel with the motor 14. The method establishes a threshold voltage for back emf voltage evaluation. The motor is energized to operate at a certain speed. Current is cut-off to the motor via a switch 16 for a time sufficient for current through the free-wheeling diode to decay to zero. The back emf voltage detected at leads of the motor is then compared via a comparator 21 to the threshold voltage.

19 Claims, 3 Drawing Sheets

STALL PROTECTION BASED ON BACK EMF DETECTION

This application is based on and claims priority from U.S. Provisional patent Application No. 60/379,318, filed May 9, 2002, the contents of which is hereby incorporated into the present specification by this reference.

FIELD OF THE INVENTION

The invention relates to detecting a blocked rotor condition of a dc motor and more particularly, detecting a blocked rotor condition at motor start up and during motor operation.

BACKGROUND OF THE INVENTION

Direct current motors are commonly used in vehicle engine cooling systems to drive, for example, and engine cooling fan. In the event a dc motor is stalled, for example if some foreign object is blocking the fan wheel or the motor, some form of blocked rotor protection is required from damaging the motor or wiring harness. Without stall protection, it is possible for electrical damage or even fire to occur from overheating of the motor.

Accordingly, there is a need to provide blocked rotor or stall protection both at motor start up and during motor operation no matter how the motor is operating (e.g., PWM mode or dc mode).

SUMMARY OF THE INVENTION

An object of the invention is to fulfill the need referred to above. In accordance with the principles of the present invention, this objective is achieved by providing a motor control circuit for detecting a condition for a rotor of a dc motor. The motor control circuit includes a dc motor having a rotor. A power supply supplies power to the motor. A free-wheeling diode is in parallel with the motor. A switch is provided to cut-off current to the motor. At least one diode is connected in series with a positive terminal of the motor to establish a voltage threshold. An open collector comparator is provided and a voltage tap is provided to detect voltage across leads of the motor. A controller is constructed and arranged to control operation of the switch such that when the switch is turned off, cutting-off current to the motor, back emf voltage can be detected via the voltage tap and be compared via the comparator to the threshold voltage.

In accordance with another aspect of the invention a method of detecting a rotor condition of a dc motor is provided. The motor is part of a motor control circuit having a free-wheeling diode in parallel with the motor. The method establishes a threshold voltage for back emf voltage evaluation. The motor is energized to operate at a certain speed. Current is cut-off to the motor via a switch for a time sufficient for current through the free-wheeling diode to decay to zero. The back emf voltage detected at leads of the motor is then compared via a comparator to the threshold voltage.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
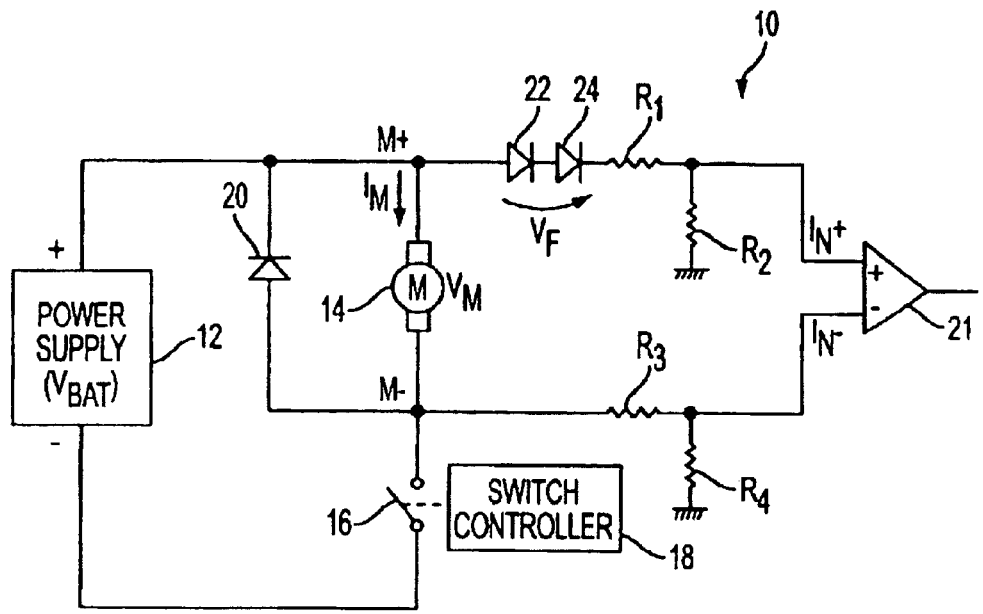
FIG. 1 is block diagram of a motor control circuit with back emf detection, provided in accordance with a first embodiment of the invention.

With reference to FIG. 1, an exemplary embodiment of a motor control circuit with back emf detection is shown, generally indicated at 10, in accordance with the principles of the present invention. A power supply 12 provides power to a motor 14. The motor 14 is a conventional dc motor having a rotor (not shown). The control circuit is contemplated for use in an engine cooling module of a vehicle in the temperature range of −40 C to 110 C and operating in the range of 100–400 Hz. It can be appreciated that the control circuit 10 can be used to determining stall of any dc motor.

Figure 2:
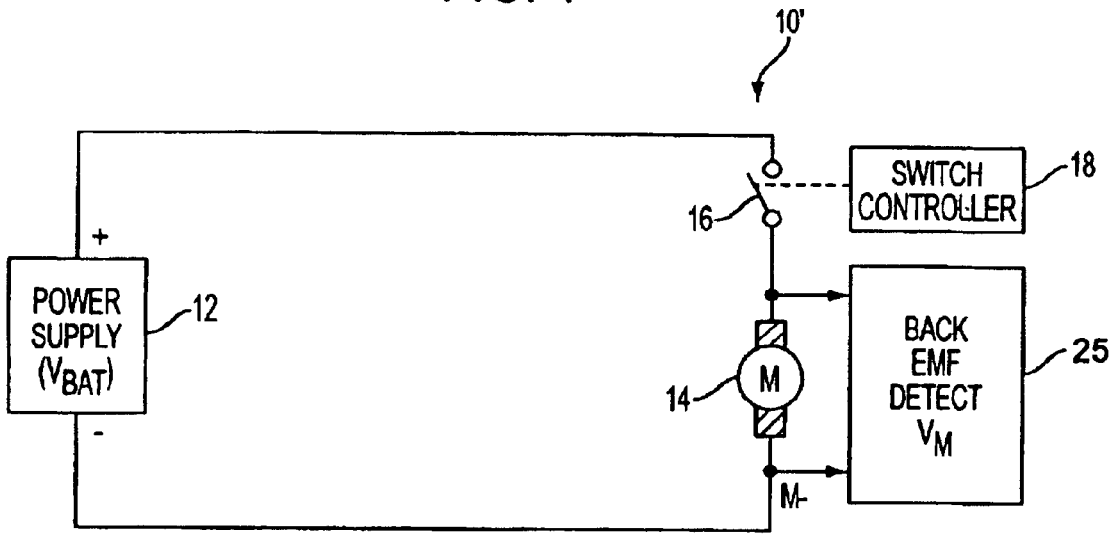
FIG. 2 is block diagram of a motor control circuit with back emf detection, provided in accordance with a second embodiment of the invention.

In FIG. 1, a switch 16 is in series with the power supply and the motor. In the embodiment of FIG. 1, the switch is connected to the negative lead of the motor. However, it can be appreciated that the switch 16 be connected to the positive lead of the motor as shown in the circuit 10 of FIG. 2.

For pulse width modulation (PWM) control of the motor 14, the switch 16 is preferably a FET or MOSFET that is controlled by a PWM signal received from a switch controller 18. However, in the broadest aspect of the invention, the switch 16 can be a relay or any device capable of cutting-off current to the motor 14.

The operation of the circuit 10 is as follows. The back emf voltage generated by the motor 14 can be measured at the motor leads, via a voltage tap 25, (FIG. 2) when the motor is forced into a "generator" mode. This means, that when an energized motor is running at a given speed, the motor current must be cut-off in order to be able to observe the generated back emf voltage at the motor's leads. When a free-wheeling diode 20 is present in parallel with the motor 14, after cutting-off the power supply current to the motor 14, there is still current flowing through the motor due to the inductance of the motor and the presence of the free-wheeling diode 20. In order to observe the back emf voltage, the measurement thereof must take place when the free-wheeling current has decayed to zero. Thus, the back emf voltage is observed after the switch 16 is off a time sufficient to permit building of the back emf voltage. In the embodiment, this time does not exceed one pulse duration.

With reference to FIG. 1, at least one diode is connected in series with the motor positive terminal (M+) in order to generate a threshold for back emf voltage evaluation. The threshold voltage is chosen for the lowest operating speed of the motor. For example, the threshold voltage can be fixed at 0.6 volts when a back emf voltage of 2 volts is expected in normal operation of the motor 14. In the embodiment, two diodes 22 and 24 are provided. The back emf voltage is measured at the motor terminals (across the motor). An open collector comparator 21 is used in comparing the threshold voltage to the back emf voltage. The comparison of back emf voltage with the threshold voltage is explained in the following equations:

$$(In+)=[(M+)-2*Vf]*k$$

$$(In-)=(M-)*k$$

$$(In+)-(In-)=[(M+)-(M-)-2*Vf]*k$$

where:
In+ is the non-inverting input of the comparator
In− is the inverting input of the comparator
M+ is the positive terminal of the motor
M− is the negative terminal of the motor
Vf is the forward voltage across a diode (e.g., diode 22)
k is a resistor divider ratio, such as:

$$k=R_2/(R_1+R_2)=R_4/(R_3+R_4)$$

In the above formula, [(M+)−(M−)] is the back emf voltage. A stall condition is indicated when In−(M−) is greater than In+(M+). The motor 14 is considered to be running properly when In+(M+) is greater than In−(M−). The motor 14 is considered to be blocked when (M+) and (M−) are at the same potential.

Figure 3A:
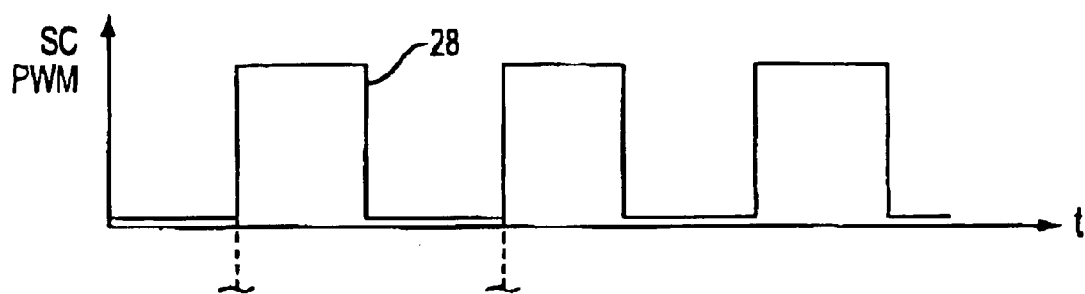
FIG. 3a is an illustration of a pulse width modulation (PWM) control signal to control operation of the motor of the invention.
Figure 3B:
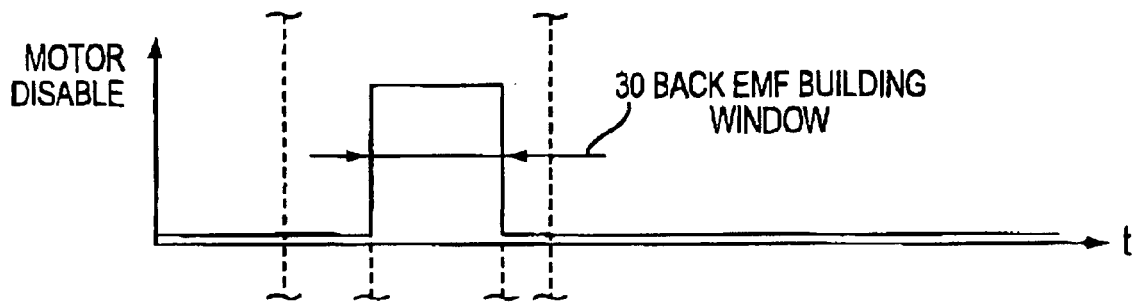
FIG. 3b is an illustration of a back emf building window when the signal of FIG. 3a is disabled.
Figure 3C:
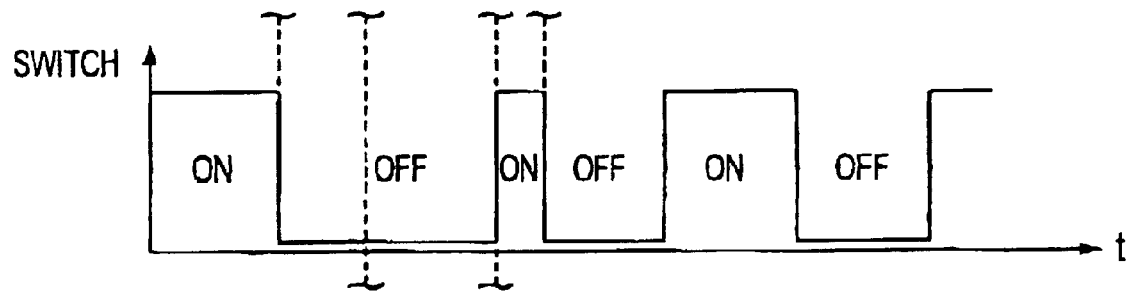
FIG. 3c is an illustration of a switch control signal during PWM operation.
Figure 3D:
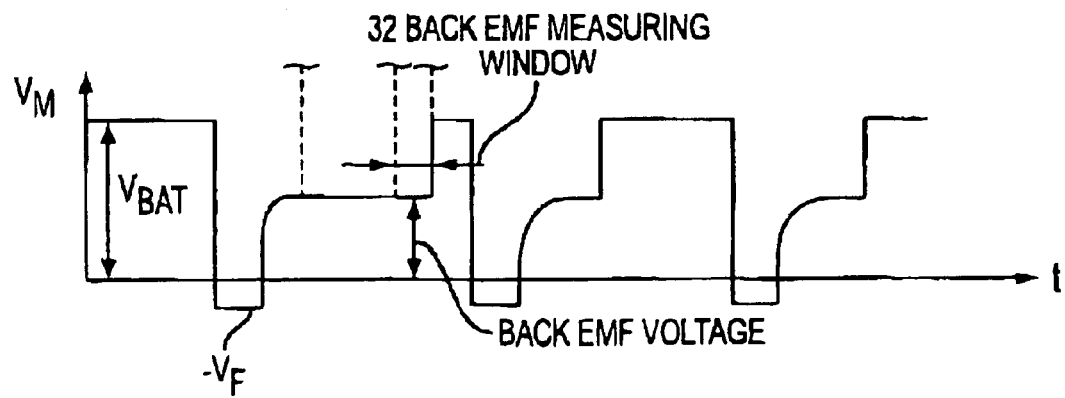
FIG. 3d is an illustration of the motor voltage and the back emf measuring window during PWM operation when the switch is turned off.
Figure 4A:
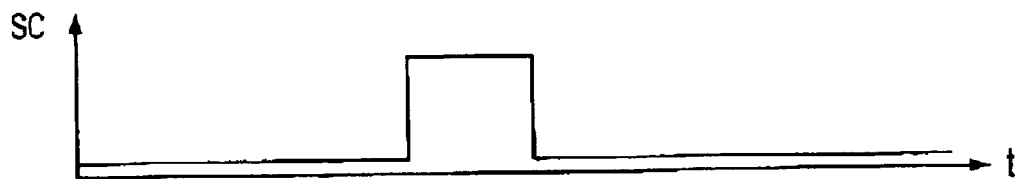
FIG. 4a is an illustration of a control signal for operating a motor in dc mode in accordance with the invention.
Figure 4B:
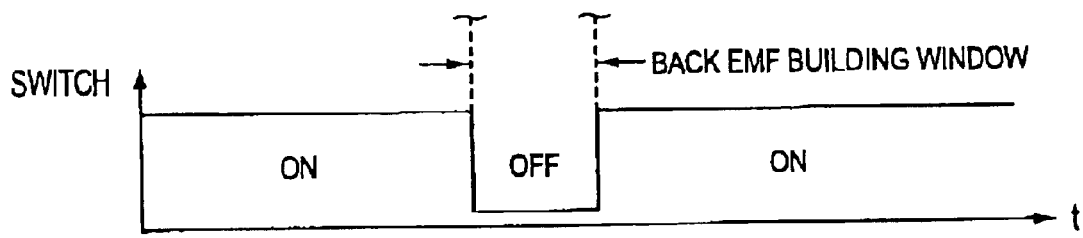
FIG. 4b is an illustration of a switch control signal during dc motor operation.
Figure 4C:
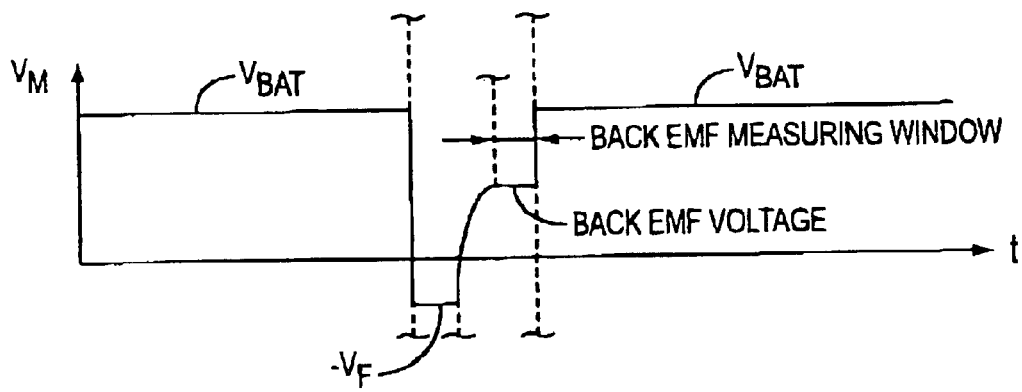
FIG. 4c is an illustration of the motor voltage during dc operation when the switch is turned off.
Figure 4D:
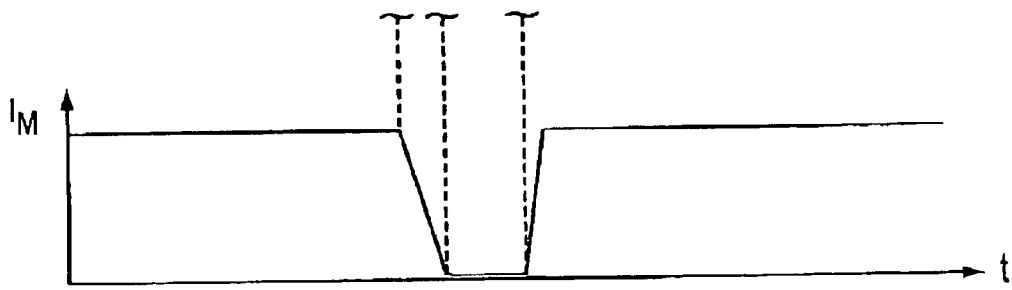
FIG. 4d is an illustration of the motor current during dc operation when the switch is turned off.

FIG. 3a shows a low frequency PWM signal 28 used to control the operation of the motor 14. The signal 28 is shown at 50% duty cycle. As shown in FIG. 3b, a back emf building window 30 overlaps asynchronously over the PWM signal 28. FIG. 3c shows the switch 16 being turned-off for less than one pulse duration. As shown in FIG. 3d, the when the switch is off, the last period of the building window is the measuring window wherein the back emf voltage is measured. Comparing the back emf voltage with the fixed threshold voltage will determine if the rotor of the motor 14 is in a blocked condition.

The method described herein can accommodate the detection of a partial stall condition of the rotor of a motor. As used herein "partial stall" means that the rotor is not in a fully blocked condition. To detect a partial stall condition, the fixed voltage threshold is replaced with a voltage proportional to the expected motor speed. For example, under PWM control a motor would operate at a certain speed with a back emf voltage expected to be, for example, 6 volts. If the threshold voltage is set at 5.5 volts for this speed, and the back emf voltage is detected to be 5 volts, this indicates that the motor is running slow. When a blocked rotor or a partial stall condition of the rotor is detected, a conventional protection scheme can be employed to protect the motor 14 and/or circuit 10 from damage.

Another function of the circuit 10 is to perform the first measurement of the back emf voltage after a time long enough to allow the motor to build up speed. A timing compromise must be achieved in order to fulfill the following two goals:

First back emf check to be performed after a time long enough so that the motor can build up speed (e.g., back emf), and Periodic back emf check, when the motor is running, to be performed often enough so that in case of a blocked rotor condition, the electrical stress (over-current) applied to the motor and electronics is minimized.

The detection of rotor condition (e.g., blocked rotor) of the dc motor 14 is independent of the driving circuit such as single or variable speed, battery voltage, and motor lead resistance. If PWM control is used, the switching frequency, PWM duty cycle and low side or high side switching element, are transparent to the blocked rotor detection method as described above.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Method of detecting a rotor condition of a dc motor, the motor being part of a motor control circuit, the motor control circuit having a free-wheeling diode in parallel with the motor, the method including:

establishing a threshold voltage for back emf evaluation by providing at least one diode connected in series with a positive motor terminal, energizing the motor to operate at a certain speed, cutting-off current to the motor for a time sufficient for current through the free-wheeling diode to decay to zero, and comparing the back emf voltage detected at leads of the motor to the threshold voltage.

2. The method of claim 1, wherein the step of cutting-off current to the motor includes controlling a switch to be turned-off preventing current to the motor.

3. The method of claim 2, wherein switch is a FET controlled by a pulse width modulated signal, and the method includes controlling the FET to cut-off current to the motor.

4. The method of claim 3, wherein the sufficient time does not exceed one pulse duration.

5. The method of claim 1, wherein the step of comparing the back emf includes using an open collector comparator and, the following formulas being used in the back emf voltage and threshold voltage comparison:

$$(In+)=[(M+)-2*Vf]*k$$

$$(In-)=(M-)*k$$

$$(In+)-(In-)=[(M+)-(M-)-2*Vf]*k$$

where:
In+ is the non-inverting input of the comparator
In− is the inverting input of the comparator
M+ is the positive terminal of the motor
M− is the negative terminal of the motor
Vf is the forward voltage across the at least one diode
k is a resistor divider ratio of values of resistors in series with the comparator, wherein a stall condition is indicated when In−(M−) is greater than In+(M+) and the motor is considered to be running properly when In+(M+) is greater than In−(M−).

6. The method of claim 1, wherein the energizing step includes operating the motor in a DC control mode, and the cutting-off step includes controlling a switch to be off only when a stall condition of the motor is to be determined.

7. The method of claim 1, wherein the step of establishing a threshold voltage includes establishing a fixed threshold voltage.

8. The method of claim 1, wherein the step of defining a threshold voltage includes establishing a threshold voltage proportional to an expected speed of the motor.

9. A motor control circuit for detecting a condition of a rotor of a motor of the circuit, the circuit comprising:

a dc motor having a rotor, a free-wheeling diode in parallel with the motor, diode means for establishing a threshold voltage for back emf evaluation, the diode means including at least one diode connected in series with a positive motor terminal, means for energizing the motor to operate at a certain speed, means for cutting-off current to the motor for a time sufficient for current through the free-wheeling diode to decay to zero, and means for comparing the back emf voltage at leads of the motor to the threshold voltage.

10. The circuit of claim 9, wherein the means for cutting-off current to the motor is a switch.

11. The circuit of claim 10, wherein switch is a FET controlled by a pulse width modulated signal.

12. The circuit of claim 11, wherein the sufficient time does not exceed one pulse duration.

13. The circuit of claim 9, wherein the means for comparing includes an open collector comparator, the following formulas being employed in the back emf voltage and threshold voltage comparison:

$$(In+)=[(M+)-2*Vf]*k$$

$$(In-)=(M-)*k$$

$$(In+)-(In-)=[(M+)-(M-)-2*Vf]*k$$

where:

In+ is the non-inverting input of the comparator

In− is the inverting input of the comparator

M+ is the positive terminal of the motor

M− is the negative terminal of the motor

Vf is the forward voltage across the free-wheeling diode k is a resistor divider ratio of values of resistors in series with the comparator, wherein a stall condition is indicated when In−(M−) is greater than In+(M+) and the motor is considered to be running properly when In+(M+) is greater than In−(M−).

14. A motor control circuit for detecting a condition for a rotor of a dc motor, the motor control circuit comprising:

a dc motor having a rotor, a power supply supplying power to the motor, a free-wheeling diode in parallel with the motor, a switch for cutting-off current to the motor, at least one diode, connected in series with a positive terminal of the motor for establishing a voltage threshold, an open collector comparator, a voltage tap for detecting voltage across leads of the motor, and a controller constructed and arranged to control operation of the switch such that when the switch is turned off, cutting-off current to the motor, back emf voltage can be measured via the voltage tap and can be compared via the comparator to the threshold voltage.

15. The circuit of claim 14, wherein the switch is a FET.

16. The circuit of claim 14, wherein the switch is a relay.

17. The method of claim 1, wherein the step of comparing the back emf includes using an open collector comparator.

18. The circuit of claim 9, wherein the means for comparing the back emf is an open collector comparator.

19. The circuit of claim 14, wherein the comparator employs the following formulas in the back emf voltage and threshold voltage comparison:

$$(In+)=[(M+)-2*Vf]*k$$

$$(In-)=(M-)*k$$

$$(In+)-(In-)=[(M+)-(M-)-2*Vf]*k$$

where:

In+ is the non-inverting input of the comparator

In− is the inverting input of the comparator

M+ is the positive terminal of the motor

M− is the negative terminal of the motor

Vf is the forward voltage across the free-wheeling diode k is a resistor divider ratio of values of resistors in series with the comparator, wherein a stall condition is indicated when In−(M−) is greater than In+(M+) and the motor is considered to be running properly when In+(M+) is greater than In−(M−).

* * * * *